(12) United States Patent
Ko (10) Patent No.: US 10,664,086 B2
(45) Date of Patent: May 26, 2020

(54) ELECTRONIC DEVICE APPLICABLE TO INTERACTION CONTROL

(71) Applicant: ACER INCORPORATED, New Taipei (TW)

(72) Inventor: Chueh-Pin Ko, New Taipei (TW)

(73) Assignee: ACER INCORPORATED, New Taipei (TW)

( * ) Notice: Subject to any disclaimer, the term of this patent is extended or adjusted under 35 U.S.C. 154(b) by 0 days.

(21) Appl. No.: 16/158,324

(22) Filed: Oct. 12, 2018

(65) Prior Publication Data

US 2019/0377451 A1 Dec. 12, 2019

(30) Foreign Application Priority Data

Jun. 7, 2018 (TW) .............................. 107119683 A (51) Int. Cl.
*G06F 3/041* (2006.01)
*G06F 1/16* (2006.01)

(52) U.S. Cl.
CPC .......... *G06F 3/0414* (2013.01); *G06F 1/1643* (2013.01); *G06F 1/1686* (2013.01); *G06F 3/0412* (2013.01); *G06F 3/0416* (2013.01)

(58) Field of Classification Search
CPC ...... G06F 3/044; G06F 3/0416; G06F 3/0414; G06F 3/0412; G06F 1/1643; G06F 1/1686; G06F 1/1626; G06F 1/1698; G09G 5/006
See application file for complete search history.

(56) References Cited

U.S. PATENT DOCUMENTS

| 2008/0195735 A1* | 8/2008 | Hodges | G06F 1/1626 709/227 |
| 2014/0043209 A1* | 2/2014 | Walker | G09G 5/006 345/1.2 |
| 2019/0107899 A1* | 4/2019 | Lu | G06F 3/0487 |

* cited by examiner

*Primary Examiner* — Hong Zhou
(74) *Attorney, Agent, or Firm* — Winston Hsu (57) ABSTRACT

Electronic devices applicable to interaction control are provided. A first electronic device includes a first force-sensitive component, a camera module, and a processing circuit, and a second electronic device includes a second force-sensitive component, a display module, and a processing circuit. At least one component within the first force-sensitive component and the second force-sensitive component is arranged to detect a contact event between the first electronic device and the second electronic device. The display module displays at least one predetermined image, and the camera module captures at least one partial image of the aforementioned at least one predetermined image, to allow the first electronic device to determine at least one relative location of the first electronic device with respect to the second electronic device, for use of the second electronic device, and more particularly, the display module displays a display content corresponding to the aforementioned at least one relative location.

13 Claims, 8 Drawing Sheets

ELECTRONIC DEVICE APPLICABLE TO INTERACTION CONTROL

BACKGROUND OF THE INVENTION

1. Field of the Invention

The present invention relates to control of user interfaces, and more particularly, to an electronic device applicable to interaction control.

2. Description of the Prior Art

Interaction mechanisms have been applied in electronic devices such as multifunctional mobile phones. Interaction mechanisms provide typical interactions between human and machine, rather than interactions between machines. Some related arts have attempted to achieve interactions between machines, but problems such as high manufacturing cost and excess space taken up by the overall structure occur as a result. Hence, there is a need for a novel method and related structure which can achieve interaction mechanisms between devices without introducing a side effect, or in a way that less likely to introduce a side effect.

SUMMARY OF THE INVENTION

An objective of the present invention is to provide an electronic device applicable to interaction control, in order to solve the above-addressed problem.

Another objective of the present invention is to provide an electronic device applicable to interaction control, in order to achieve an interaction mechanism between devices without introducing a side effect, or in a way that less likely to introduce a side effect.

At least one embodiment of the present invention provides a first electronic device, applicable to interact with a second electronic device. The first electronic device comprises a first force-sensitive component, a camera module and a processing circuit. The first force-sensitive component is arranged to detect a contact event between the first electronic device and the second electronic device, and the camera module is arranged to capture at least one partial image of at least one predetermined image, wherein a display module of the second electronic device displays said at least one predetermined image. The processing circuit is coupled to the first force-sensitive component as well as the camera module. The processing circuit determines at least one relative location of the first electronic device with respect to the second electronic device according to said at least one partial image for the second electronic device to use, and the display module of the second electronic device displays a display content corresponding to said at least one relative location.

At least one embodiment of the present invention provides a second electronic device applicable to interact with a first electronic device. The second electronic device comprises a second force-sensitive component, a display module and a processing circuit. The second force-sensitive component is arranged to detect a contact event between the first electronic device and the second electronic device. The display module is arranged to display at least one predetermined image, wherein a camera module of the first electronic device captures at least one partial image of said at least one predetermined image, to allow the first electronic device to determine at least one relative location of the first electronic device with respect to the second electronic device for the second electronic device to use. The processing circuit is coupled to the second force-sensitive component as well as the display module. The processing circuit controls the display module to display said at least one predetermined image, and controls the display module to display a display content corresponding to said at least one relative location.

The present invention is capable of performing proper control of operations of the electronic devices, and more particularly, is capable of achieving an interaction mechanism between devices in limited space to avoid various problems presented in the related arts. In addition, the embodiments illustrated by the present invention may solve the related art problems without significantly introducing additional costs.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
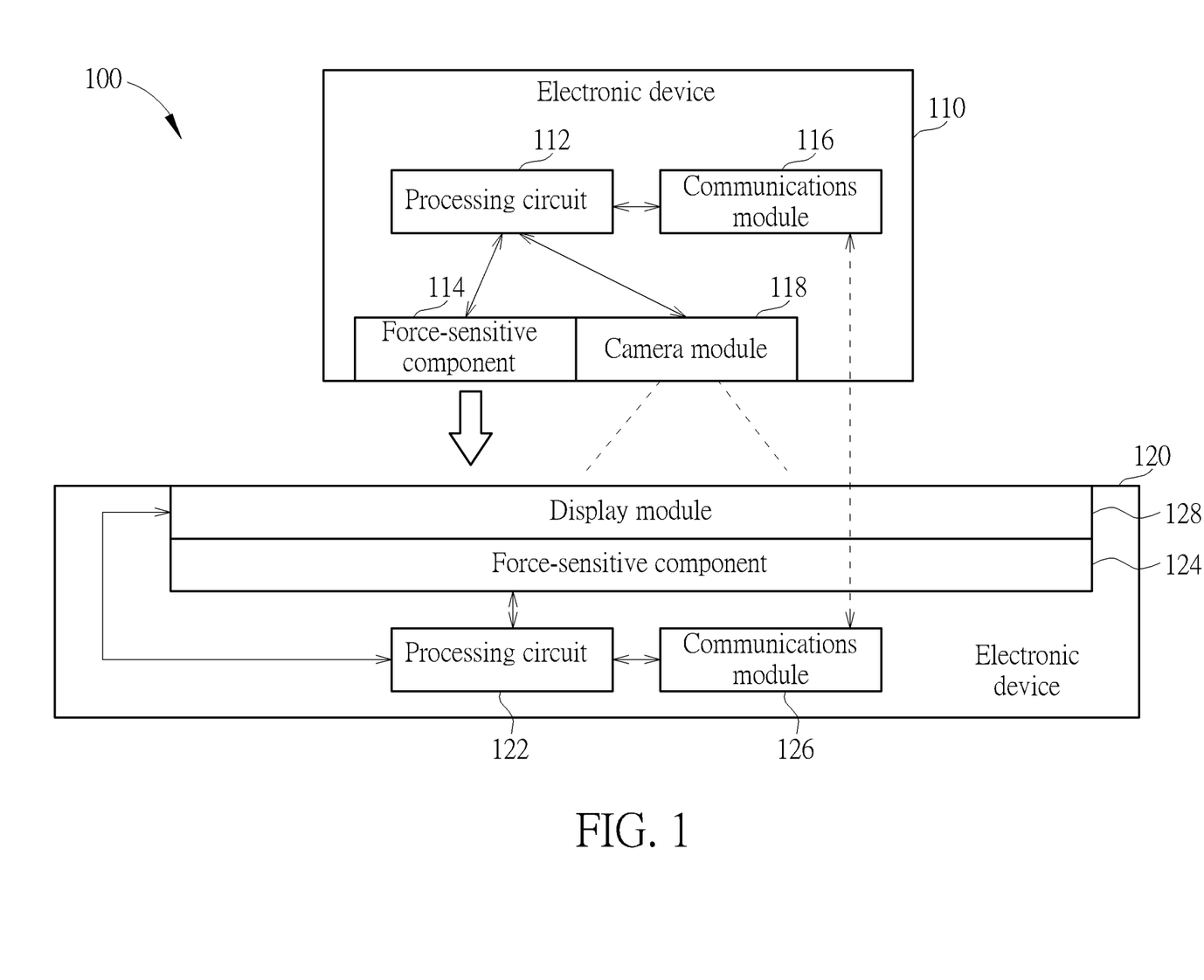
FIG. 1 is a diagram illustrating an interaction system according to an embodiment of the present invention.

FIG. 1 is a diagram illustrating an interaction system 100 according to an embodiment of the present invention. The interaction system 100 may comprise electronic devices 110 and 120. Examples of the electronic device 110 may include, but are not limited to: a tablet, multifunctional mobile phone, wearable device, simple input gadget (e.g. gadget allowing for simple input commands), toy, etc. Examples of the electronic device 120 may include, but are not limited to: an interaction table, all-in-one personal computer (PC), laptop computer, tablet, multifunctional mobile phone, large sized toy, etc., wherein the size of the electronic device 120 is usually larger than that of the electronic device 110, for example, may be 8 inches or above, but the present invention is not limited thereto.

As shown in FIG. 1, the electronic device 110 may comprise a processing circuit 112 (e.g. a processor, microprocessor, microcontroller, etc.), at least one force-sensitive component 114 (e.g. one or more force-sensitive components, such as force sensors, pressure sensors, etc.), a communications module 116 (particularly, a wireless communications module conforming to a predetermined communications standard such as Bluetooth or Wi-Fi) and a camera module 118. The electronic device 120 may comprise a processing circuit 122 (e.g. a processor, microprocessor, microcontroller, etc.), at least one force-sensitive component 124 (e.g. one or more force-sensitive components, such as force sensors, pressure sensors, etc.), a communications module 126 (particularly, a wireless communications module conforming to the predetermined communications standard such as Bluetooth or Wi-Fi) and a display module 128, but the present invention is not limited thereto. As long as the result is substantially the same, the structure of the interaction system 100 of the present invention is modifiable. For example, the quantity, type, arrangement, etc. of at least one of the electronic devices 110 and 120 (e.g. the electronic device 110 and/or the electronic device 120) can be modified. In another example, some components in any of the electronic devices 110 and 120 may be integrated into a same module.

According to this embodiment, the processing circuits 112 and 122 may be arranged to control operations of the electronic devices 110 and 120, respectively, and the force-sensitive components 114 and 124 may be arranged to perform force-related sensing for the electronic devices 110 and 120 (e.g. sensing pressure, such as the pressure that one of the electronic devices 110 and 120 applies to the other), respectively. In addition, the communications modules 116 and 126 may be arranged to perform wireless communications for the electronic devices 110 and 120, respectively, in order to allow exchanging of information between the electronic devices 110 and 120. Additionally, under the control of the processing circuit 112, the camera module 118 may capture one or more images for the electronic device 110, such as at least one portion (e.g. a portion or all) of a predetermined image displayed by the display module 128, for use of interaction control. Under the control of the processing circuit 122, the display module 128 may display the predetermined image for the electronic device 120 for further use of the electronic device 110, and may also display images regarding interaction control (e.g. modified images such as images modified in response to interaction control) for the electronic device 120, in order to improve the user experience.

Figure 2:
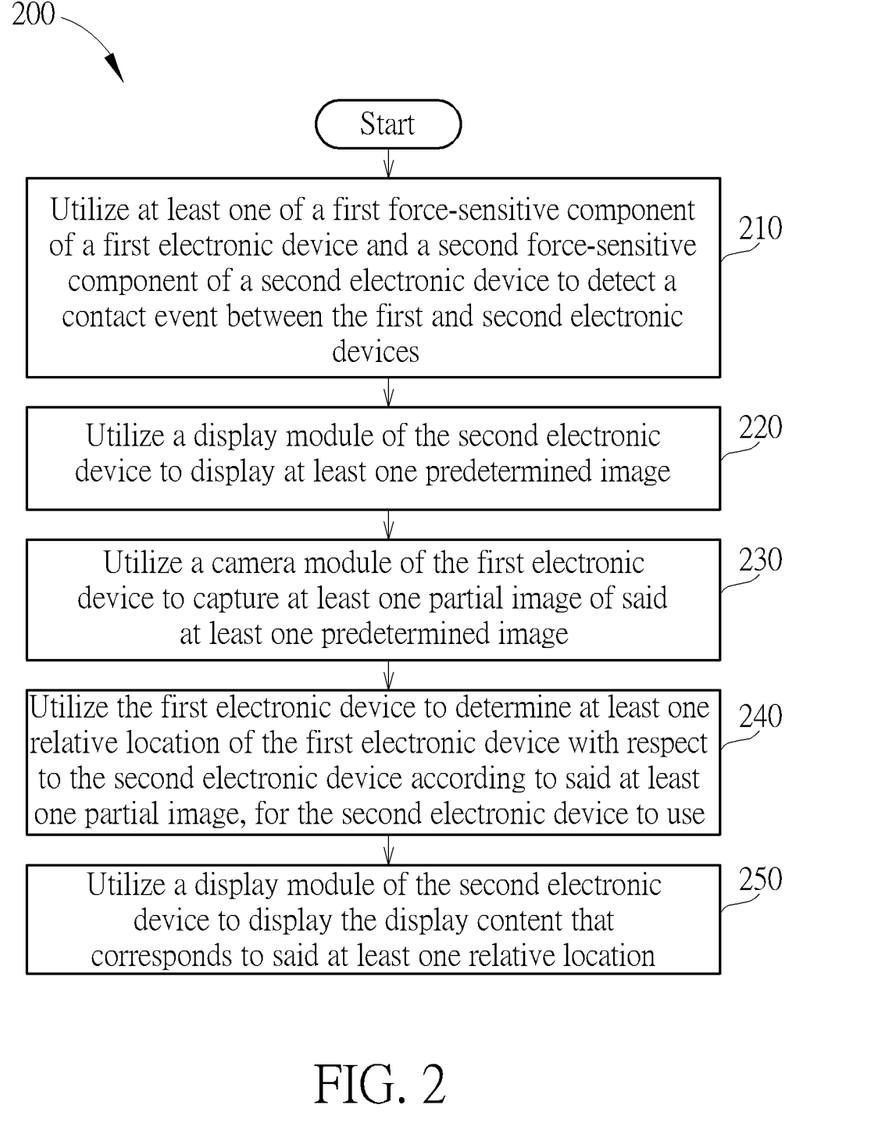
FIG. 2 is a diagram illustrating a working flow of a method for performing interaction control according to an embodiment of the present invention.

FIG. 2 is a diagram illustrating a working flow 200 of a method for performing interaction control according to an embodiment of the present invention, wherein the method may be applied to the interaction system 100, the electronic devices 110 and 120, the processing circuits 112 and 122, and other components shown in FIG. 1. The processing circuits 112 and 122 may control the respective operations of the electronic devices 110 and 120 according to the method. For better understanding, the first electronic device and second electronic device in the working flow 200 may be described using the electronic devices 110 and 120 respectively, and their own components (e.g. the first and the second force-sensitive components) may respectively be described using the respective components of the electronic devices 110 and 120 (e.g. the force-sensitive components 114 and 124).

In Step 210, the interaction system 100 (for example, at least one of the electronic devices 110 and 120, such as the electronic devices 110 and/or 120; for another example, at least one of the processing circuits 112 and 122, such as the processing circuits 112 and/or 122) may utilize at least one component within the force-sensitive component 114 of the electronic device 110 and the force-sensitive component 124 of the electronic device 120 (e.g. the force-sensitive components 114 and/or 124) to detect a contact event between the electronic devices 110 and 120, and more particularly, may utilize the aforementioned at least one of the force-sensitive components 114 and 124 to sense the pressure between the electronic devices 110 and 120, and, when at least one condition is satisfied, determine that the contact event occurs, wherein the aforementioned at least one condition may comprise: the pressure falls within a predetermined pressure range. The condition may further comprise: the period when the pressure falls within the predetermined pressure range reaches a predetermined time threshold.

In Step 220, the interaction system 100 may utilize the display module 128 of the electronic device 120 to display at least one predetermined image (e.g. one or more predetermined images). The processing circuit 122 may control the display module 120 to display the aforementioned at least one predetermined image, for example, may store the aforementioned at least one predetermined image into a storage (not shown) in the electronic device 120 in advance, and may display the aforementioned at least one predetermined image (which is read from this storage) in Step 220, but the present invention is not limited thereto.

In Step 230, the interaction system 100 may utilize the camera module 118 of the electronic device 110 to capture at least one partial image of the aforementioned at least one predetermined image (e.g. one or more partial images).

In Step 240, the interaction system 100 may utilize the electronic device 110 (particularly, the processing circuit 112 therein) to determine at least one relative location (e.g. one or more relative locations) of the electronic device 110 with respect to the electronic device 120 according to the aforementioned at least one partial image, for the electronic device 120 to use. For example, the electronic device 110 may store the aforementioned at least one predetermined image into a storage (not shown) in the electronic device 110 in advance, and may determine the aforementioned at least one relative location according to the location of the aforementioned at least one partial image (which is read from this storage) on the aforementioned at least one predetermined image in Step 240. In another example, based on a predetermined rule, the aforementioned at least one partial image carries location information for indicating the aforementioned at least one relative location, and the electronic device 110 may obtain the location information from the aforementioned at least one partial image based on the predetermined rule, in order to determine the aforementioned at least one relative location according to the location information.

In Step 250, the interaction system 100 may utilize the display module 128 of the electronic device 120 to display the display content that corresponds to the aforementioned at least one relative location, such as the above-mentioned modified images. The processing circuit 122 may control the display module 120 to display the display content that corresponds to the aforementioned at least one relative location, such as corresponding auxiliary information, icons, symbols, etc. For example, the processing circuit 122 may perform the operations in Step 250 in response to one or more actions of a user placing the electronic device 110 on the aforementioned at least one relative location.

According to some embodiments, one or more steps may be added into, modified, or removed from the working flow 200. According to some embodiments, as long as the implementation of the present invention is not hindered, some operation(s) of one of the electronic devices 110 and 120 may be performed by the other of the electronic devices 110 and 120.

Figure 3:
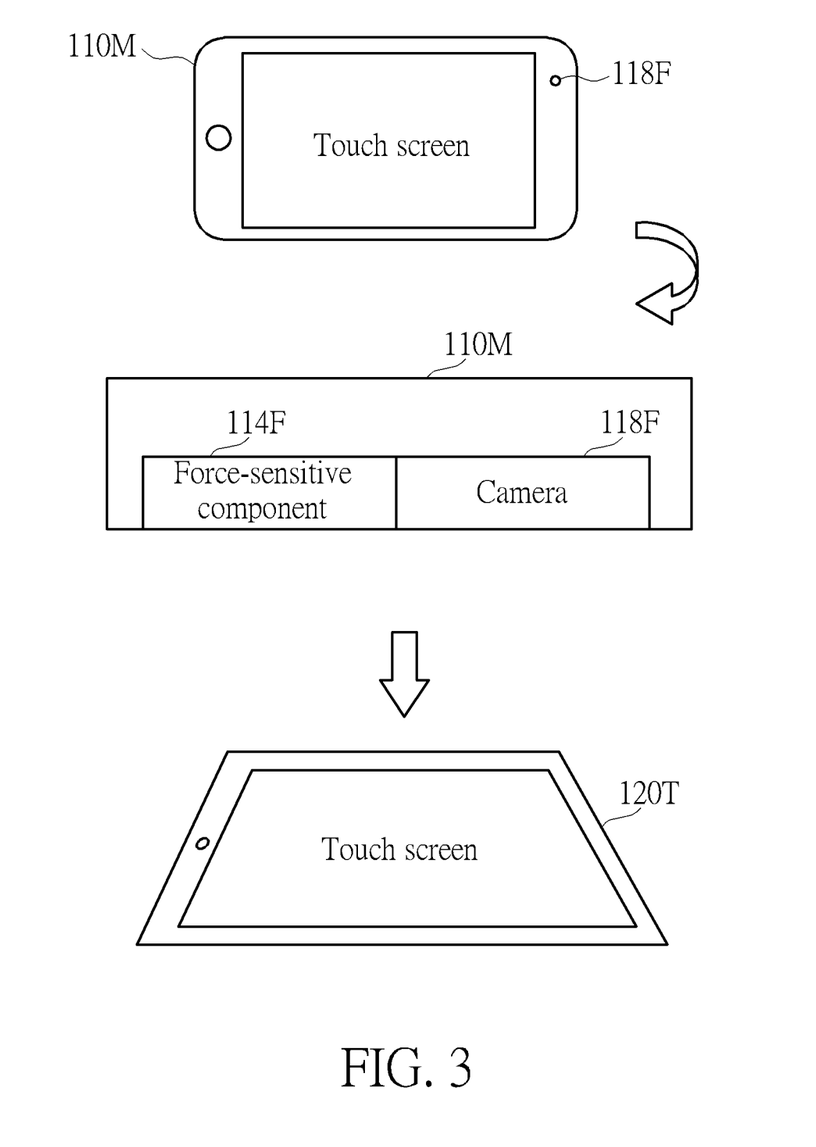
FIG. 3 is a diagram illustrating implementation details of the interaction system according to an embodiment of the present invention.

FIG. 3 is a diagram illustrating implementation details of the interaction system 100 according to an embodiment of the present invention. The electronic devices 110M and 120T may be taken as examples of the electronic devices 110 and 120, respectively. For better understanding, the electronic devices 110M and 120T may be implemented as a multifunctional mobile phone and an all-in-one personal computer respectively, and may have their own touch screens with built-in force-sensitive components 114F and 124 respectively. The force-sensitive component 114F, the camera 118F (particularly, the front camera) and the touch screen of the electronic device 120T may be taken as examples of the force-sensitive component 114, the camera module 118 and the display module 128 respectively, but the present invention is not limited thereto. In some embodiments, the force-sensitive components 114F and 124 may be located above or under its corresponding touch screens, respectively. In some embodiments, the force-sensitive components 114F and 124 may be transparent.

Figure 4:
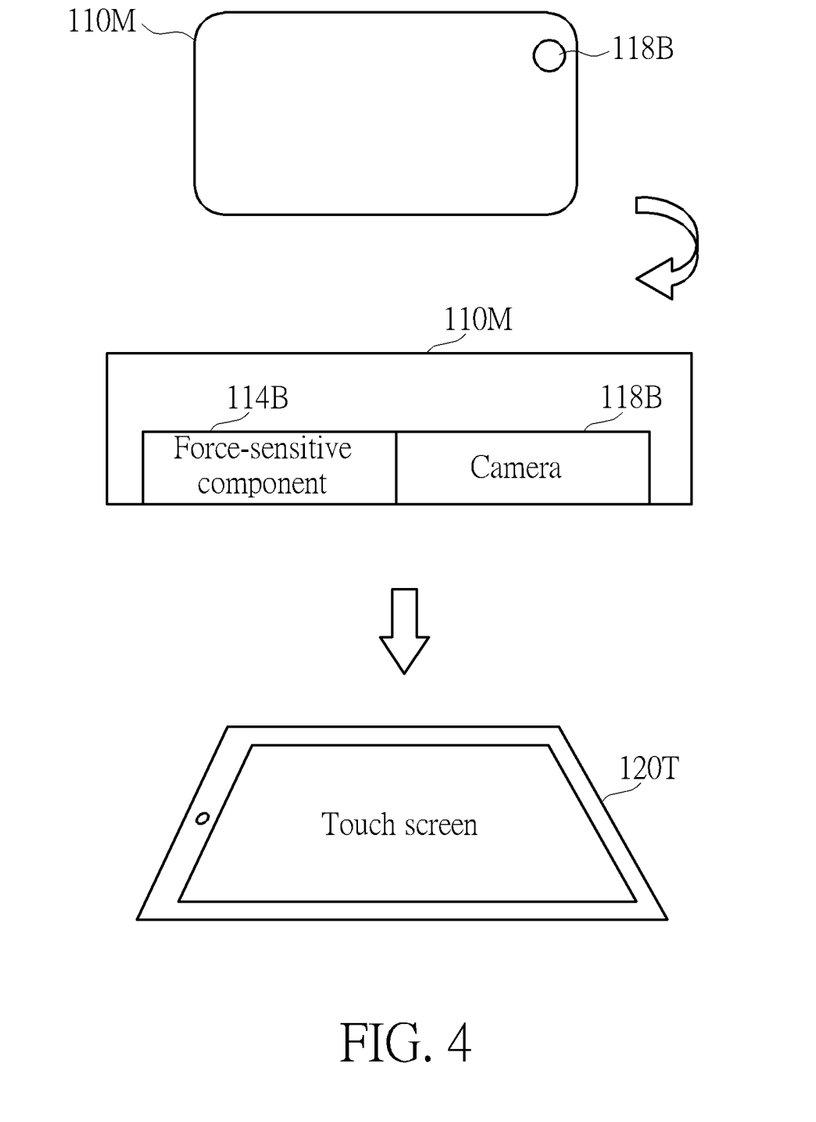
FIG. 4 is a diagram illustrating implementation details of the interaction system according to another embodiment of the present invention.

FIG. 4 is a diagram illustrating implementation details of the interaction system 100 according to another embodiment of the present invention. The force-sensitive component 114B and the camera 118B (particularly, the back camera) may be taken as examples of the force-sensitive component 114 and the camera module 118 respectively, but the present invention is not limited thereto. For brevity, similar descriptions for this embodiment are not repeated in detail here.

According to some embodiments, the force-sensitive component 114 may comprise the force-sensitive components 114F and 114B, and the camera module 118 may comprise the cameras 118F and 118B.

Figure 5:
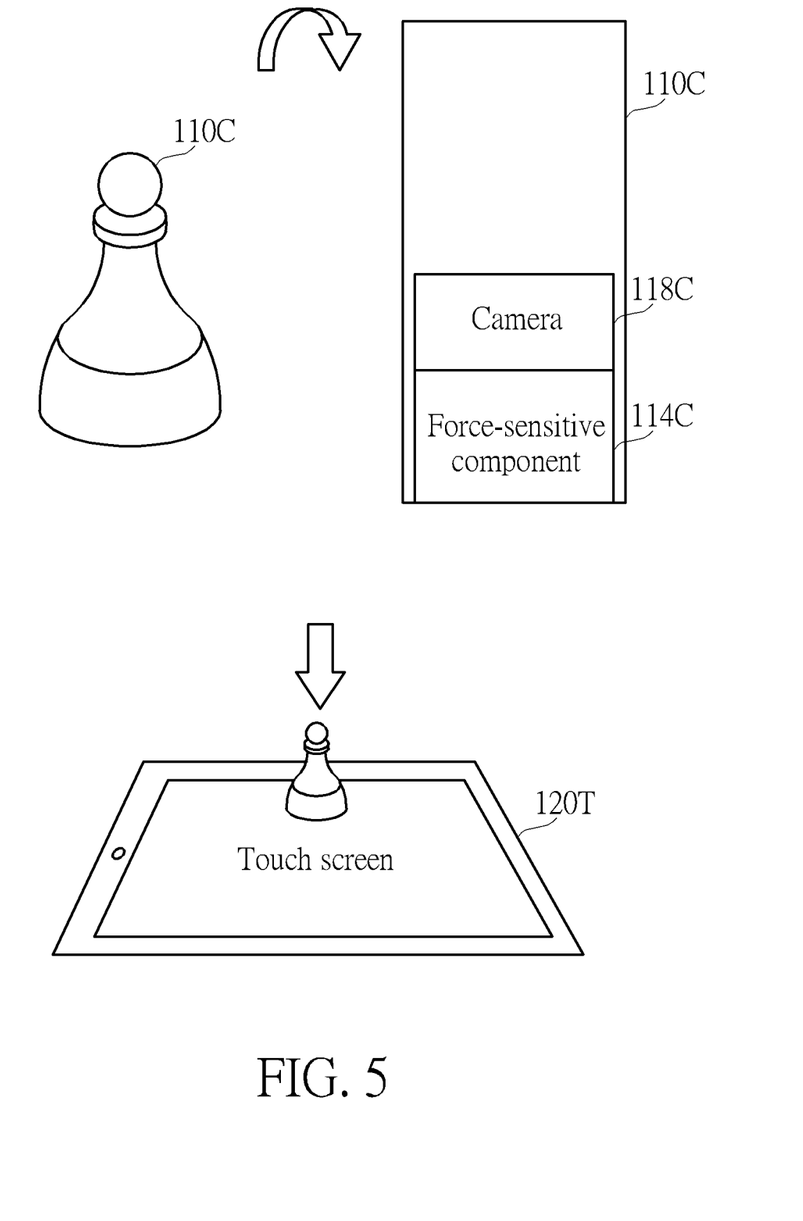
FIG. 5 is a diagram illustrating implementation details of the interaction system according to yet another embodiment of the present invention.

FIG. 5 is a diagram illustrating implementation details of the interaction system 100 according to yet another embodiment of the present invention. The electronic device 110C may be taken as an example of the electronic device 110. For better understanding, the electronic device 110C may be implemented as a toy (e.g. an electronic chess set), wherein the force-sensitive component 114C and the camera 118C may be taken as examples of the force-sensitive component 114 and the camera module 118 respectively, and the force-sensitive component 114C may be transparent, but the present invention is not limited thereto. For brevity, similar descriptions for this embodiment are not repeated in detail here.

Figure 6:
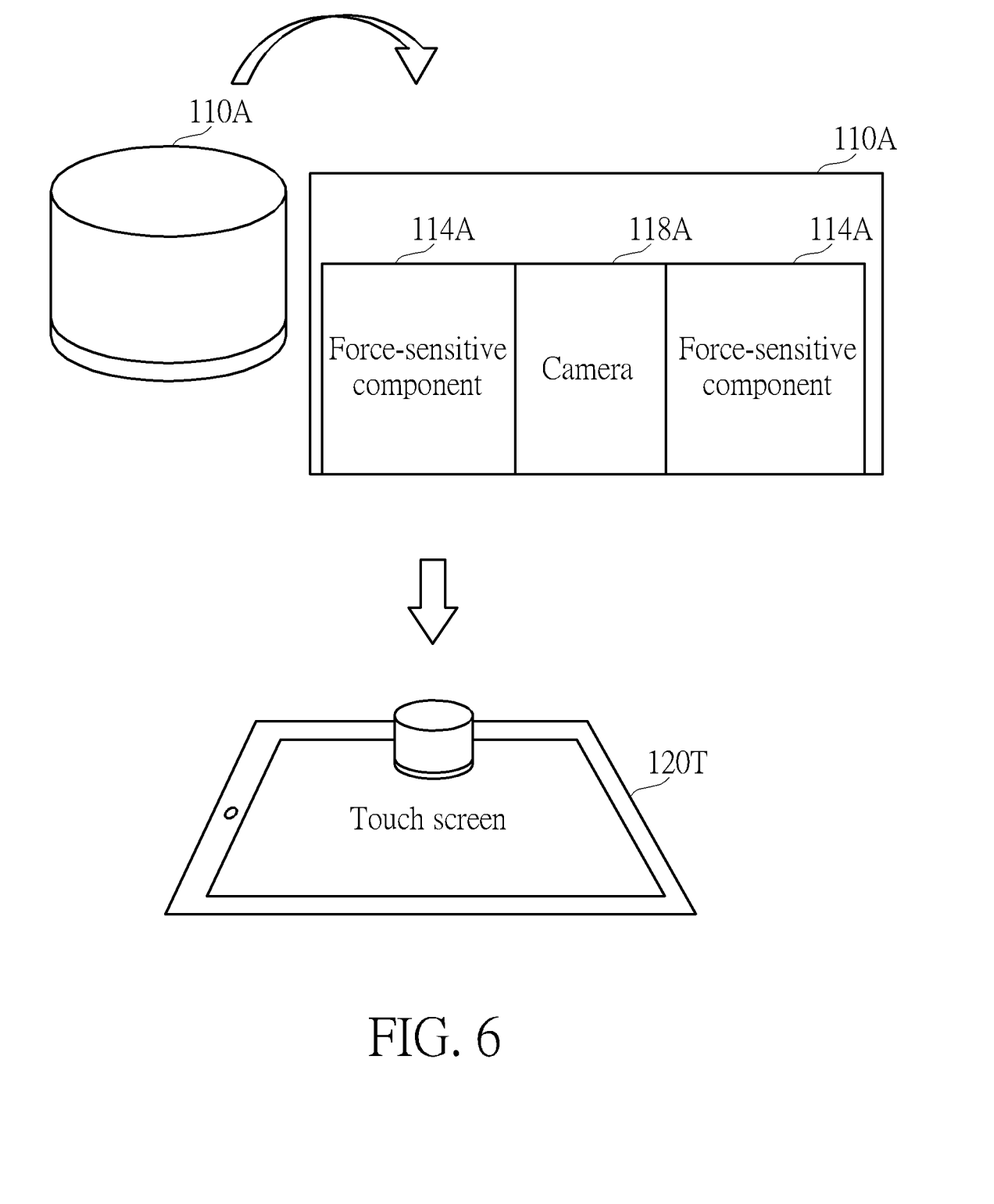
FIG. 6 is a diagram illustrating implementation details of the interaction system according to still another embodiment of the present invention.

FIG. 6 is a diagram illustrating implementation details of the interaction system 100 according to still another embodiment of the present invention. The electronic device 110A may be taken as an example of the electronic device 110. For better understanding, the electronic device 110A may be implemented as a simple input gadget, wherein the force-sensitive component 114A and the camera 118A may be taken as examples of the force-sensitive component 114 and the camera module 118 respectively, and the force-sensitive component 114A may be located around the camera 118A (e.g. surrounding the camera 118A), but the present invention is not limited thereto. For brevity, similar descriptions for this embodiment are not repeated in detail here.

Figure 7:
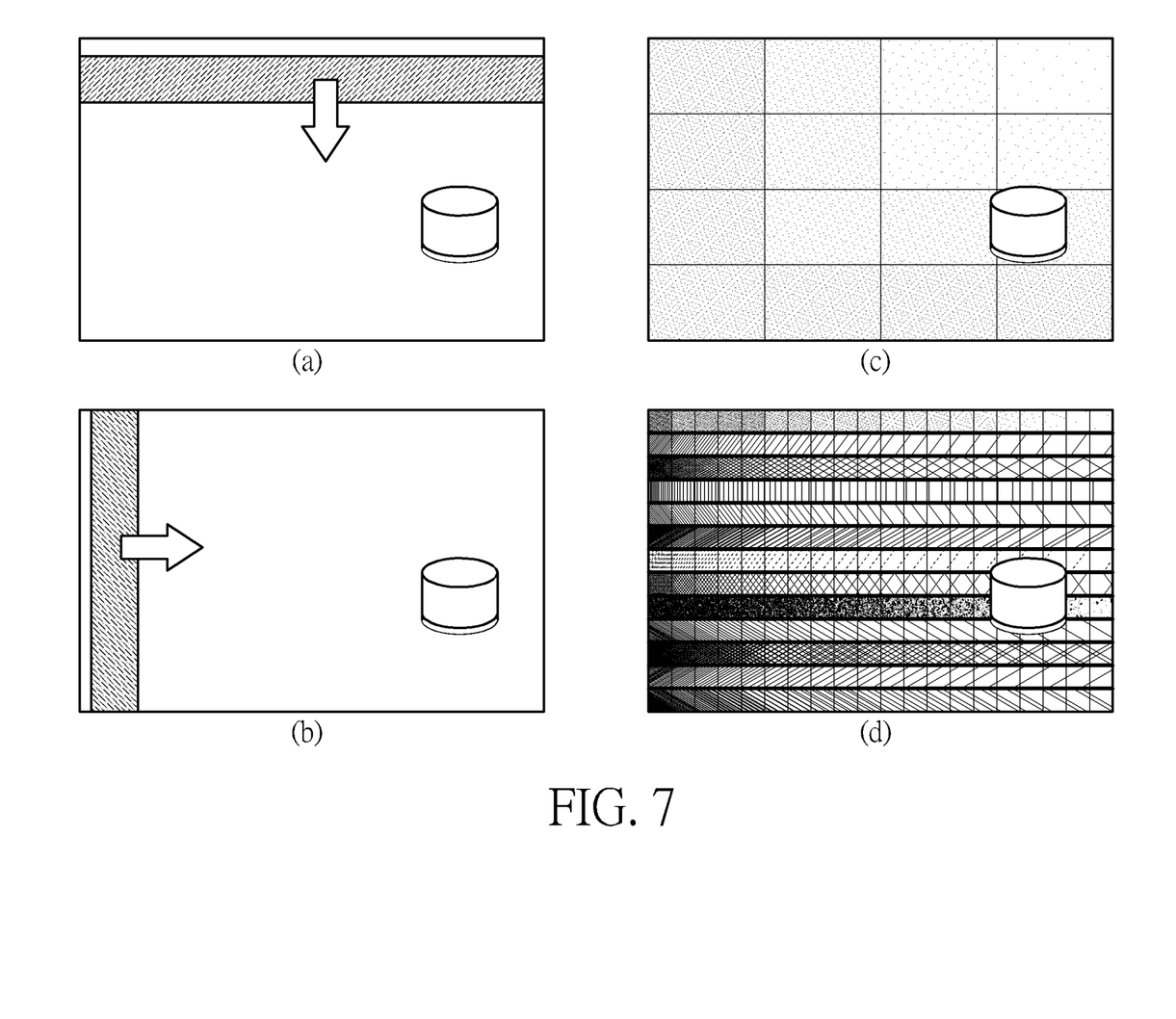
FIG. 7 illustrates some examples of predetermined images in the method.

FIG. 7 illustrates some examples of the predetermined image mentioned in the method mentioned above. For better understanding, the electronic device 110A such as a simple input gadget may be illustrated in FIG. 7, to indicate that different relative locations thereof may respectively correspond to different location information carried by the predetermined image.

Example (a) comprises a series of predetermined images which may be arranged to sequentially display a downwardly-moving horizontal black stripe (depicted by a shaded pattern). When the occurrence of the contact event is confirmed or determined, the processing circuit 122 may control the display module 128 to start displaying the series of predetermined images, making the horizontal black stripe move downwards at a steady speed (e.g. a first speed). Since the display period of each predetermined image in the series of predetermined images and the total display period of the series of predetermined images are known, when detecting the horizontal black stripe through the camera 118A, the electronic device 110A (e.g. the processing circuit 112) may determine a time period (such as the period between the time point when the occurrence of the contact event is confirmed and the current time point), and determine the Y coordinate value of the relative location of the electronic device 110A according to the ratio of this time period to this total display period.

Example (b) comprises another series of predetermined images which may be arranged to sequentially display a rightward-moving vertical black stripe (depicted by a shaded pattern). After completing displaying the series of predetermined images, the processing circuit 122 may control the display module 128 to start displaying the other series of predetermined images, making the vertical black stripe move to the right-hand side at a steady speed (e.g. a second speed). Since the display period of each predetermined image of the other series of predetermined images and the total display period of the other series of predetermined images are known already, when detecting the vertical black stripe via the camera 118A, the electronic device 110A (e.g. the processing circuit 112) may determine a time period (such as the period between the time point when the occurrence of displaying is confirmed and the current time point), and determine the X coordinate value of the relative location of the electronic device 110A according to the ratio of this time period to this total display period.

Example (c) comprises a multi-area image which may be divided into multiple areas, wherein the distribution of the respective average brightness of the areas and the brightness distribution within each area of the areas are based on the predetermined rule. For example, the respective average brightness of the areas may differ from one another, and may vary with the change of the area locations, and more particularly, may increase upwardly and rightward (e.g. from bottom to top and from left to right; and the brightness in each area of the areas may vary with the change of the locations, and more particularly, may decrease upwards and rightward (e.g. from bottom to top and from left to right); but the present invention is not limited thereto. In some examples, the predetermined rule may be modified, and the multi-area image will change correspondingly.

Example (d) comprises a multi-area image which may be divided into multiple sets of areas, and two adjacent sets of areas may be separated by a bold horizontal bar, wherein the respective colors of the multiple sets of areas (depicted by various types of patterns in FIG. 7), the distribution of the respective average brightness of multiple areas in each set of areas within the multiple sets of areas, and the brightness distribution within each area of the multiple areas are based on the predetermined rule. For example, the respective colors of the multiple sets of areas may be different from one another; and the respective average brightness of the areas in each set of areas within the multiple sets of areas may be different from one another, and may vary with the change of area locations, and more particularly, may increase from left to right; but the present invention is not limited thereto. In some examples, the predetermined rule may be modified, and the multi-area image will change correspondingly.

According to some embodiments, the number of the multiple areas in Example (c) and the way of dividing or differentiating them may be modified. In addition, according to some embodiments, the set count of the multiple sets of areas in Example (d) and the way of dividing or differentiating them, and/or the number of the multiple areas in Example (d) and the way of dividing or differentiating them may be modified.

According to some embodiments, examples of the aforementioned at least one predetermined image may include, but are not limited to: one or a combination of various image characteristics (such as colors, shapes, sizes, distributions, etc.), and actual images (such as photos of landscapes).

Figure 8:
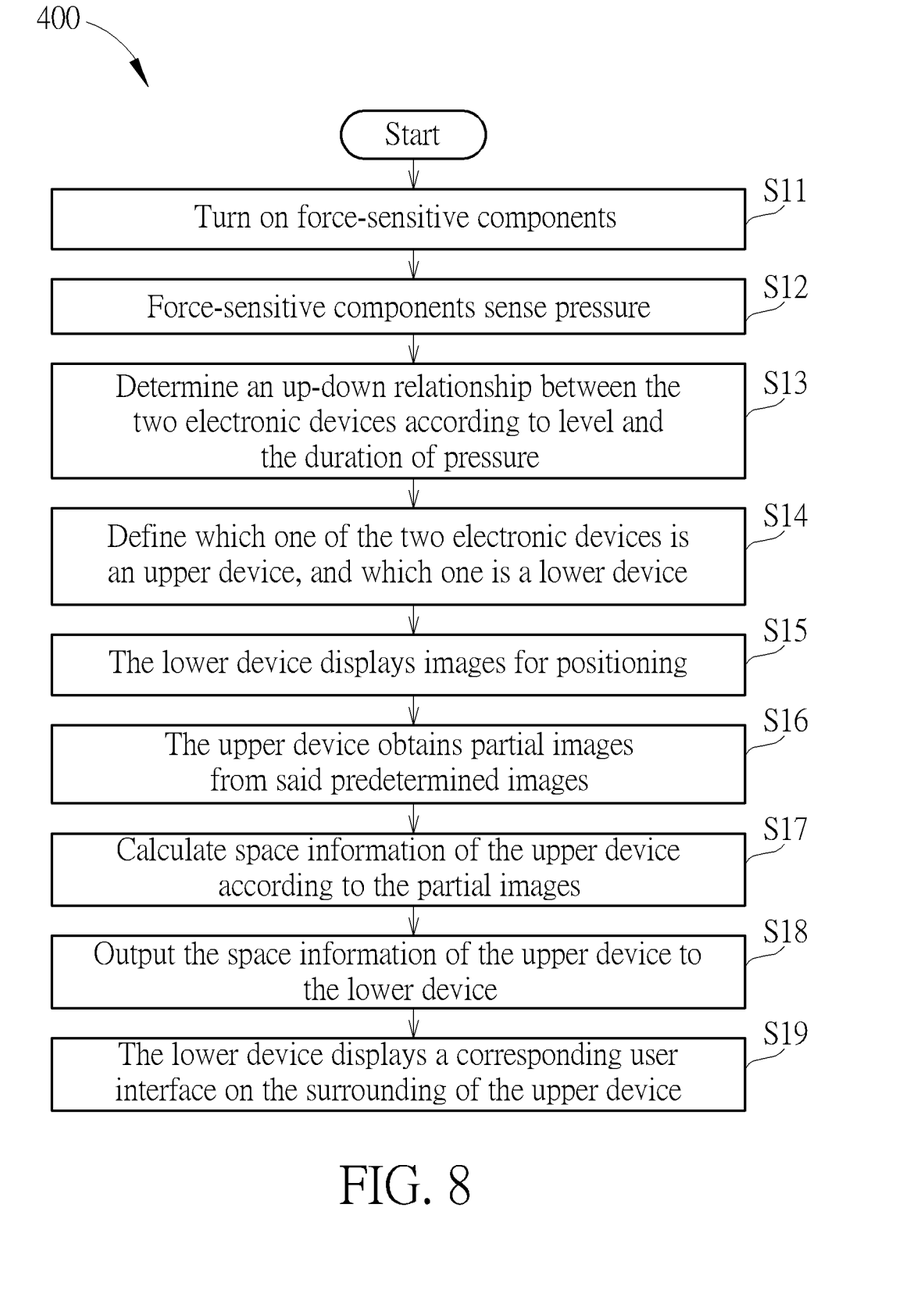
FIG. 8 illustrates a working flow of the method according to an embodiment of the present invention.

FIG. 8 illustrates a working flow 400 of the method according to an embodiment of the present invention. For better understanding, the user may place the electronic device 110 on the electronic device 120, resulting in pressure between the two electronic devices, wherein the electronic devices 110 and 120 may be regarded as an upper device and a lower device, respectively. The electronic devices 110 and 120 (such as the upper device and the lower device) may respectively sense the pressure via the force-sensitive components 114 and 124 mentioned in Steps S11-S14, in order to identify each other, and may utilize the aforementioned at least one predetermined image to perform positioning in Steps S15-S18, in order to determine the aforementioned at least one relative location for further usage in Step S19.

In Step S11, the electronic devices 110 and 120 may turn on the force-sensitive components 114 and 124, respectively.

In Step S12, the electronic devices 110 and 120 may utilize the force-sensitive components 114 and 124 to sense pressure, respectively.

In Step S13, at least one of the electronic devices 110 and 120 (e.g. the processing circuits 112 and/or 122 thereof) may determine whether there is an up-down relationship between the electronic devices 110 and 120 according to the level and the duration of pressure, in order to obtain the device attributes. Each of the processing circuits 112 and 122 may be arranged to determine that the aforementioned at least one condition is satisfied. More specifically, the aforementioned at least one condition may comprise: the pressure falls within the predetermined pressure range (e.g. 50 gram/ square centimeter, or any of other predetermined values); and the period when the pressure falls within the predetermined pressure range reaches the predetermined time threshold (e.g. 3 seconds, or any of other predetermined values). By utilizing the wireless communications between the communications modules 116 and 126, the processing circuit 112 may inform the processing circuit 122 that the aforementioned at least one condition is satisfied, and may transmit the device attributes of the electronic device 110. The processing circuit 122 may receive the device attributes in order to confirm the occurrence of the contact event.

In Step S14, the electronic device 120 (e.g. the processing circuit 122) may define which one of the electronic devices 110 and 120 is an upper device, and define the other as a lower device. In an example, the electronic device 110 is the upper device, and the electronic device 120 is the lower device.

In Step S15, the lower device (i.e. the electronic device 120 is this case) may display predetermined image(s) (e.g. one or more predetermined images) for positioning, such as that shown in any of Examples (a)-(d).

In Step S16, the upper device (i.e. the electronic device 110 in this case) may obtain partial image(s) (e.g. one or more partial images) from the predetermined image(s).

In Step S17, the upper device may calculate the space information of the upper device according to the partial image(s), such as the aforementioned at least one relative location.

In Step S18, the upper device may output the space information of the upper device to the lower device.

In Step S19, the lower device may display a corresponding user interface (e.g. the display content corresponding to the aforementioned at least one relative location, such as corresponding auxiliary information, icons, symbols, etc.) on the surrounding of the upper device.

According to some embodiments, one or more steps may be added to, modified, or removed from the working flow 400.

According to some embodiments, the inter-device relationship between the electronic devices 110 and 120 may comprise the predetermined pressure range and the predetermined time threshold. For example, the electronic devices 110 and 120 may connect to at least one network (e.g. the Internet) in advance, and may obtain the inter-device relationship according to the history record, such as the inter-device relationship created for executing any of the working flows 200 and 400, wherein the inter-device relationship may be uploaded to a database beforehand, for the electronic devices 110 and 120 to download data thereof when there is a need. According to the inter-device relationship, the electronic devices 110 and 120 may confirm the occurrence of the contact event and/or define which one amongst them is the upper device, and which one amongst them is the lower device. According to some embodiments, the inter-device relationship may further comprise the respective device attributes of the electronic devices 110 and 120, such as size, weight, product model number, etc. According to some embodiments, the inter-device relationship may be determined with the aid of other information, such as the user account, relationships between friends (e.g. the friends on social network), and wireless connection state (e.g. whether wireless signals from peer device are detectable).

According to some embodiments, the electronic device 110 (e.g. the processing circuit 112) may perform image analysis according to the aforementioned at least one partial image, in order to determine the relative height (i.e. the Z coordinate value), tilt angle, rotation angle, etc. of the electronic device 110 with respect to the electronic device 120, to enable the electronic device 120 to correspondingly modify the user interface displayed by the display module 128.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A first electronic device, applicable to interact with a second electronic device, comprising:
   a first force-sensitive component, arranged to detect a contact event between the first electronic device and the second electronic device;
   a camera module, arranged to capture at least one partial image of at least one predetermined image, wherein a display module of the second electronic device displays said at least one predetermined image; and
   a processing circuit, coupled to the first force-sensitive component and the camera module;
   wherein the predetermined image is a moving image comprising a series of predetermined images, the processing circuit determines at least one relative location of the first electronic device with respect to the second electronic device according to said at least one partial image for the second electronic device to use, a total display period of the series of predetermined images, and a time period comprising a time between the contact event and a time the camera module captures the partial image, and the display module of the second electronic device displays a display content corresponding to said at least one relative location.

2. The first electronic device of claim 1, wherein when the first force-sensitive component detects the contact event, the first force-sensitive component is arranged to sense a pressure between the first electronic device and the second electronic device; and the contact event is confirmed when the pressure falls within a predetermined pressure range.

3. The first electronic device of claim 2, wherein the contact event is confirmed when the pressure falls within a predetermined pressure range, wherein a period the pressure falls within the predetermined pressure range is longer than a predetermined time threshold.

4. The first electronic device of claim 1, wherein the first electronic device stores said at least one predetermined image and determines said at least one relative location according to at least one location of said at least one partial image on said at least one predetermined image.

5. The first electronic device of claim 1, wherein said at least one partial image comprises a location information for indicating said at least one relative location; and the first electronic device obtains the location information from said at least one partial image in order to determine said at least one relative location according to the location information.

6. The first electronic device of claim 1, wherein the processing circuit determines at least one relative location of the first electronic device with respect to the second electronic device according to a ratio between the time period and the total display period.

7. The first electronic device of claim 1, wherein the series of predetermined images comprise a downwardly-moving horizontal black stripe, the time the camera module captures the partial image corresponds to a time the camera module captures an image comprising the horizontal black stripe, and the relative location of the first electronic device with respect to the second electronic device is a Y co-ordinate value.

8. The first electronic device of claim 1, wherein the series of predetermined images comprise a sideways-moving vertical black stripe, the time the camera module captures the partial image corresponds to a time the camera module captures an image comprising the vertical black stripe, and the relative location of the first electronic device with respect to the second electronic device is an X co-ordinate value.

9. A second electronic device, applicable to interact with a first electronic device, comprising:
a second force-sensitive component, arranged to detect a contact event between the first electronic device and the second electronic device;
a display module, arranged to display at least one predetermined image, wherein a camera module of the first electronic device captures at least one partial image of said at least one predetermined image, the predetermined image being a moving image comprising a series of predetermined images, in order to allow the first electronic device to determine at least one relative location of the first electronic device with respect to the second electronic device for the second electronic device to use, a total display period of the series of predetermined images, and a time period comprising a time between the contact event and a time the camera module captures the partial image; and
a processing circuit, coupled to the second force-sensitive component and the display module;
wherein the processing circuit controls the display module to display said at least one predetermined image, and controls the display module to display a display content corresponding to said at least one relative location.

10. The second electronic device of claim 9, wherein when the second force-sensitive component detects the contact event, the second force-sensitive component is arranged to sense a pressure between the first electronic device and the second electronic device; and the contact event is confirmed when the pressure falls within a predetermined pressure range.

11. The second electronic device of claim 10, wherein the contact event is confirmed when the pressure falls within a predetermined pressure range, wherein a period the pressure falls within the predetermined pressure range is longer than a predetermined time threshold.

12. The second electronic device of claim 9, wherein the second electronic device stores said at least one predetermined image for the display module to display; and the first electronic device stores said at least one predetermined image, and determines said at least one relative location according to at least one location of said at least one partial image on said at least one predetermined image that is stored in the first electronic device.

13. The second electronic device of claim 9, wherein said at least one partial image carries location information for indicating said at least one relative location; and the first electronic device obtains the location information from said at least one partial image, in order to determine said at least one relative location according to the location information.

* * * * *